E. G. THOMAS.
SIGNAL FOR WEIGHING SCALES.
APPLICATION FILED OCT. 13, 1917.
1,392,808.
Patented Oct. 4, 1921.
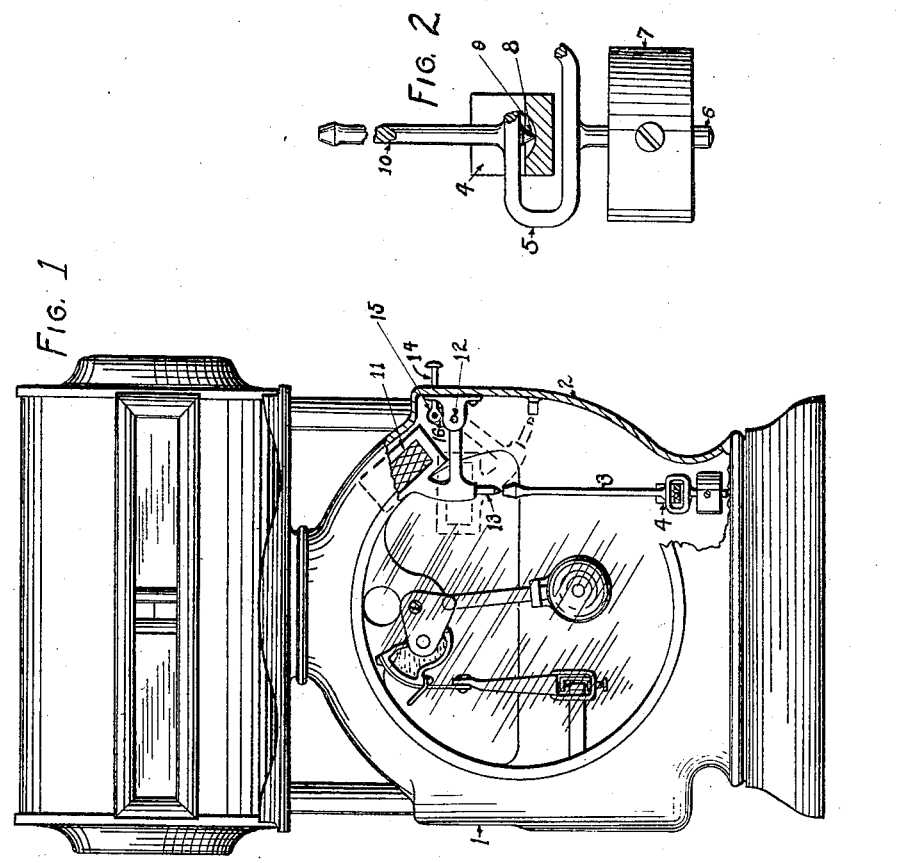
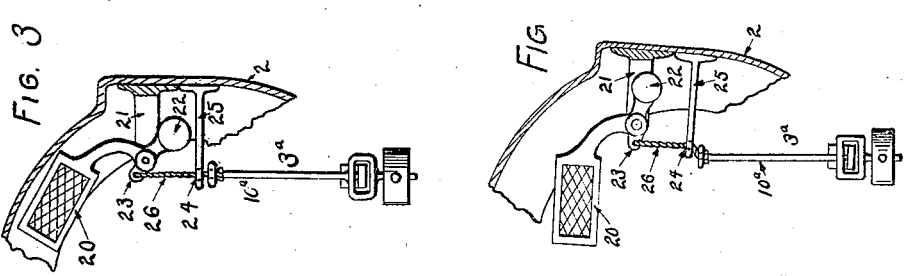
Witnesses
M. A. Weckerly.
Inventor
Edward G. Thomas
By George R. Frye.
Attorney

UNITED STATES PATENT OFFICE.

EDWARD G. THOMAS, OF TOLEDO, OHIO, ASSIGNOR TO TOLEDO SCALE COMPANY, OF TOLEDO, OHIO, A CORPORATION OF NEW JERSEY.

SIGNAL FOR WEIGHING-SCALES.

1,392,808.     Specification of Letters Patent.     Patented Oct. 4, 1921.

Application filed October 13, 1917. Serial No. 196,513.

*To all whom it may concern:*

Be it known that I, EDWARD G. THOMAS, a citizen of the United States, residing at Toledo, in the county of Lucas and State of Ohio, have invented certain new and useful Improvements in Signals for Weighing-Scales, of which the following is a specification.

This invention relates to devices for indicating whether or not a weighing scale is in a level position or beyond a certain degree out of level position in order that there will be pointed out the need for its adjustment should it be beyond an allowable degree out of level.

The majority of States and towns now have ordinances and regulations providing for the degree of accuracy of weighing scales which may be used in the territory covered by such laws and providing for penalties for the use of scales which do not weigh within the tolerances which the regulations provide, the enforcement of these laws being given to a body of inspectors whose duty it is to examine the scales and note whether they act within the prescribed standard. In order not to incur the financial penalties which will arise from the use of inaccurate scales, as well as to give honest weight in their transactions, the users of scales must use all possible precautions to insure the accuracy of their weighing devices. The makers of scales on their part are prepared to furnish to the general public scales which will weigh within very narrow limits of accuracy, but it is requisite that the scales while in use shall be maintained in the position for which they were originally adjusted. Since, however, the position of the scale depends upon the solidity of the counter or table upon which it is placed, it is obvious that the scale may be accidentally thrown out of level by the warping or other change in shape of its support, or by the temporary bending of the counter or table through the depositing upon it of heavy weights of material.

The purpose of my invention is to furnish an indication of an out-of-level position which shall forcibly attract the eye and be located in a prominent position, thus effectively notifying the user of the scale that the scale is not in condition for accurate weighing. Provision may also be made for displaying the indicator to the customer as well as to the user to permit a check on any dealer who might desire to use the scale when not in position for honest weighings.

With the above objects in view, which will readily appear from the following description, my invention consists of the novel construction, combination and arrangement of parts more fully described in the following specification and set forth in the subjoined claims.

Referring to the drawings, which portray an illustrative form of my invention, and wherein similar reference numerals designate similar parts throughout the several views:—

Figure 1 shows a front elevation of a well-known type of scale in which a portion of the casing has been broken away to show some of the parts which enter into my invention;

Fig. 2 is a detail elevation of a pivoted weighted member forming a part of my indicating device, showing the method of its support from the casing of the scale;

Fig. 3 shows a modified form of my device in normal or non-indicating position; and Fig. 4 is a view of the device shown in Fig. 3 when the scale has been tilted from a level position.

Referring to the drawings, 1 designates a typical counter weighing scale, and in the preferred form shown employs a pendulum as its weight-offsetting element. A normally vertical weighted member 3 is pivotally supported upon a bracket 4 on the casing 2 in such a manner as to move freely in all vertical planes. The weighted member 3 preferably consists of a frame 5 carrying a downwardly extending rod 6 upon which a weight 7 is fastened in any suitable manner and an upwardly-extending rod 10 of a length relatively much greater than the distance from the point of the pivot to the weight 7. A cone pivot 8 carried centrally of the frame 5 registers with and enters a cup-shaped depression 9 in the bracket 4. It will be noted that by virtue of this construction and mounting the weighted member will always maintain a vertical position, and a relatively slight movement of the arm 6 carrying the weight will cause a much greater movement of the arm 10.

A signal 11 is pivotally secured to the casing 2 of the scale, as at 12, so as to swing in a vertical plane, and normally is hidden behind a portion of the casing, as shown in full lines in Fig. 1. Attached to the signal 11 is a downwardly extending member 13 preferably terminating in a point which is so located as to register with and rest upon the upper end of rod 10 when the scale is in a level position. If the end of member 13 does not so register with the end of rod 10, the signal 11 will not be supported and will fall to the position indicated by dotted lines in Fig. 1, where it will be prominently displayed to the eye of both merchant and customer. Since the weighted member 3 will occupy the same position relatively to the horizontal at all times because of its freedom of motion on cone pivot 8, such a lack of registration between the lower end of member 13 and upper end of rod 10 can only occur when the scale is tipped to an out-of-level position. When the scale becomes tipped in this manner, member 13 will slip from the end of rod 10 and then, being unsupported, the signal will fall to the dotted position.

When the scale has been restored to a level position, signal 11 may be reset in its hidden position by pulling out a rod 14 pivoted at 15 to an arm 16 secured to the signal.

Inasmuch as a minute change of level in the position of the scale may not result in an error in its weighing sufficiently great to cause it to exceed the tolerance permitted by the laws, the relative dimensions of the bottom of member 13 and the upper end of rod 10 are designed so that the signal will be supported until the scale has changed its level sufficiently to cause the error in weighing due to it to approach or exceed the permitted tolerance, and if it is desired that the change of level of the scale shall be greater in one direction than in a direction at right angles thereto before the operation of the signal shall occur, the end of rod 10 or the lower end of member 13 or both may be made of greater dimensions in one direction than in another. In Figs. 3 and 4 the weighted member 3ª is similarly supported from the casing 2 of the scale so as to be free to move in all vertical planes, and the signal 20 pivoted in a bracket 21 attached to the casing of the scale is so weighted that the target is normally retained in a concealed position by a weight 22. A cord, chain or other flexible connection 26 is attached to an arm 23 on the target 20, passes through an opening 24 in a guide-plate 25 secured to casing 2, and is then firmly fastened to the end of rod 10ª of weighted member 3ª. It will be obvious that a change in level in the scale will cause relative motion between the end of rod 10ª and opening 24 in guide-plate 25, as is illustrated in Fig. 4, and without regard to the direction in which this motion occurs a part of the flexible connection 26 will be drawn downward through the opening, pulling upon the signal 20 and thus bringing the signal into view from behind the casing of the scale, calling the attention of the user of the scale to the fact that the scale is not in suitable condition to weigh in an accurate manner. In order that a greater change of level of the scale may occur in one direction than in a direction at right angles thereto before the signal 20 is displayed, opening 24 in bracket 25 may be elongated in the desired direction.

Any suitable warning, descriptive or instructive marking may be arranged upon the display signal, whereby the user will be notified that the scale is out of level and enabled to correct its position.

While it will be apparent that the illustrated embodiment of my invention herein disclosed is well calculated to adequately fulfil the objects primarily stated, it is to be understood that my invention is susceptible to variation, modification and change without departing from the spirit and scope of the invention as set forth in the subjoined claims.

Having described my invention, I claim:

1. The combination with a weighing scale having a frame, of a signal hidden behind a portion of the frame when the scale is level and means whereby the signal is automatically displayed when the scale is not in level position.

2. The combination with a weighing scale having a frame, of a signal carried by the frame and hidden when the scale is level, and means whereby the signal is automatically exposed to view when the scale is not in level position.

3. The combination with a weighing scale having a frame, of a signal pivoted upon the frame and hidden when the scale is level, and means whereby the signal is automatically exposed to view only when the scale is out of level position beyond a predetermined degree.

4. The combination with a weighing scale having a frame, of a signal carried by the frame, means also carried by the frame for maintaining the signal in a hidden position while the scale is level, and means whereby the signal is automatically exposed to view when the scale is out of level position beyond a predetermined degree.

5. The combination with a weighing scale having a frame, of a signal hidden behind a portion of the frame when the scale is level, means whereby the signal is automatically displayed when the scale is not in level position, and means for restoring the signal to its hidden position when the scale is leveled.

6. The combination with a weighing scale having a frame, of a weighted member pivotally supported thereon, a signal normally supported in a hidden position by the weighted member, and means whereby said signal will be displayed on the change of position of the weighted member relatively to the scale frame when the scale is tilted.

7. The combination with a weighing scale having a frame, of a weighted member pivotally supported thereon and capable of swinging in all directions, a signal normally hidden from view, and supported upon the weighted member, and means whereby said signal will be displayed upon a change of position of the weighted member relatively to the scale frame.

8. The combination with a weighing scale having a frame, of a weighted member pivotally supported thereon and capable of swinging in all directions, means for multiplying the motion of the weighted portion of said member, a signal normally hidden from view and operatively associated with the weighted member at its point of greatest motion, whereby said signal will be displayed upon a change of position between the scale frame and the weighted member.

9. The combination with a weighing scale having a frame, of a weighted member pivotally supported thereon and capable of swinging in all directions, means for multiplying the motion of the weighted portion of said member, a signal normally hidden from view and operatively associated with the weighted member at its point of greatest motion, whereby said signal will be displayed upon a change of position between the scale frame and the weighted member, and means for restoring the signal to its original position.

10. The combination with a weighing scale having a frame, a weighted member pivotally supported thereon, a signal normally retained in hidden position by the weighted member, and means for causing said signal to assume a new position upon a change due to tilting of said frame in the relative positions of the scale frame and weighted member.

11. In combination, a scale frame, a pivoted signal normally hidden from view behind the frame, a weighted member mounted upon the frame and normally supporting said signal, and means controlled by the weighted member for causing the signal to fall into an exposed position upon a change of level of said scale.

12. In combination, a scale frame, a pivoted signal attached thereto and urged toward exposed position, and a weighted member pivotally supported on said scale frame and adapted to retain the signal in concealed position while the scale frame is in a level position.

13. In a scale, in combination, a scale frame, an overweighted pivoted signal attached thereto and normally urged by gravity toward exposed position, a weighted member universally pivotally supported on said scale frame and adapted when in one position only to retain said signal against movement to exposed position.

EDWARD G. THOMAS.

Witnesses:
F. A. CROWLEY,
GEORGE R. FRYE.